United States Patent
Dekmezian et al.

(10) Patent No.: US 6,734,265 B1
(45) Date of Patent: May 11, 2004

(54) LINEAR LOW DENSITY POLYETHYLENES WITH HIGH MELT STRENGTH AND HIGH MELT INDEX RATIO

(75) Inventors: Armenag Hagop Dekmezian, Kingwood, TX (US); Natalie Ann Merrill, Houston, TX (US)

(73) Assignee: Univation Technologies, LLC., Houston, TX (US)

( * ) Notice: Subject to any disclaimer, the term of this patent is extended or adjusted under 35 U.S.C. 154(b) by 24 days.

(21) Appl. No.: 09/680,644

(22) Filed: Oct. 6, 2000

(51) Int. Cl.$^7$ .................. C08F 4/642; C08F 210/16
(52) U.S. Cl. .............. 526/119; 526/348; 526/348.2; 526/348.6; 525/240
(58) Field of Search .................. 526/348, 119, 526/348.6, 348.2; 525/240

(56) References Cited

U.S. PATENT DOCUMENTS 5,786,291 A  7/1998 Speca et al. ............. 502/104
6,207,606 B1 * 3/2001 Lue et al. ................ 502/113
6,339,134 B1 * 1/2002 Crowther et al. .......... 526/128
6,420,580 B1 * 7/2002 Holtcamp et al. .......... 556/11

FOREIGN PATENT DOCUMENTS

| EP | 0 605 952 A2 | 7/1994 |
| WO | WO 95/04761 A1 | 2/1995 |
| WO | WO 99/35174 A1 | 7/1999 |
| WO | WO 99/60032 A1 | 11/1999 |
| WO | WO 00/68279 A1 | 11/2000 |
| WO | WO 01/34664 A1 | 5/2001 |

* cited by examiner

Primary Examiner—Roberto Rabago
(74) Attorney, Agent, or Firm—Osborne McKinney

(57) ABSTRACT

Linear low density polyethylenes (LLDPES) that have relatively high melt index ratios (MIR) and relatively high melt strength (MS). This combination of melt properties is achieved by a substantially non blended LLDPE. Catalysts used to produce these polyethylenes are generally a blend of bridged bisindenyl zirconocene dichlorides, where one zirconocene contains saturated indenyls and the other unsaturated indenyls.

8 Claims, 3 Drawing Sheets

LINEAR LOW DENSITY POLYETHYLENES WITH HIGH MELT STRENGTH AND HIGH MELT INDEX RATIO

FIELD OF THE INVENTION

Embodiments of the present invention relate generally to linear low density polyethylenes having a high melt index (MI), high melt index ratio (MIR) and a high melt strength (MS). These polyethylenes may be produced in a gas phase process utilizing a blend of supported metallocene catalysts.

BACKGROUND OF THE INVENTION

Since the advent of Linear Low Density Polyethylene (LLDPE), these generally linear polymers have benefited their users with physical and mechanical properties suitable for applications such as molded parts, foams, and films.

All substantially linear polymers have drawbacks that in melt processing, especially for film production, can hamper their utilization. These drawbacks are: (1) general lack of melt strength, which may manifest itself in bubble instability during film blowing process or in surging and edge weave in cast films; and (2) a low or flat response of viscosity to shear; this latter may manifest itself in higher melt viscosity leading to undesirable higher motor loads and torque requirements for extruders.

To mitigate these drawbacks, processors have for decades, resorted to blending in branched polymers such as conventional, high-pressure process produced low density polyethylene (LDPE), into the LLDPE. However, such post-reactor additions can add to the cost as well as diminish some of the very desirable physical property improvements associated with LLDPE such as its toughness properties.

There is a commercial need therefore for a LLDPE that will have improved melt strength and improved shear thinning in response to applied shear while maintaining the important physical and mechanical properties.

SUMMARY OF THE INVENTION

We have discovered that a substantially non-blended LLDPE having relatively narrow molecular weight distribution, can have high melt strength, generally conferring good bubble stability during the melt processing of these polyethylenes in blown film processes, high melt index (MI), and high MIR, generally indicative of a relatively high degree of shear thinning, both parameters indicating directionally improved processability.

This substantially non-blended LLDPE may be made by a gas phase polymerization of ethylene and an α-olefin. The polymerization may be catalyzed by a supported metallocene catalyst combination. The supported catalyst will include the metallocenes:

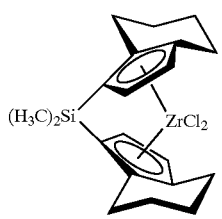

a

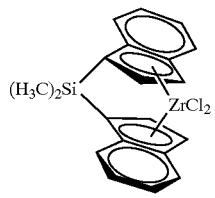

b

The indenyl or the thetrahydroindenyl (THI) rings may be substituted. The substituents may be linear or branched alkyl groups one to twenty carbons long, siloxy and its derivatives, phenyl and its derivatives, or any substituted group that gives an active catalyst system.

The two metallocene components may be placed on separate supports and/or each may be placed on the same support. However, the two metallocenes may be placed on separate supports and mixed. The support materials are inorganic silicas and inorganic oxide materials, which include those of Groups 2, 3, 4, 5, 13 or 14 metal oxides. In a another embodiment, the catalyst support materials include silica, alumina, silica-alumina, and mixtures thereof. The carrier of the catalyst of this invention has a surface area in the range of from 10–700 m$^2$/g, pore volume in the range of from 0.1–4.0 cc/g and average particle size in the range of from 10–500 μm. Other embodiments of our invention include the ratio of the two metallocenes a:b in the range of from 90:10–10:90 in a polymerization process. The catalyst system may be activated by any means known by those of skill in the art, such as methylalumoxanes, aluminum alkyls, and mixtures thereof, non-coordinating anions, or mixed activators.

BRIEF DESCRIPTION OF THE DRAWINGS

These and other features, aspects, and advantages of the present invention will become better understood with reference to the following description and appended claims and accompanying drawings, where:

DETAILED DESCRIPTION OF THE INVENTION

Zirconocenes

Figure 1:
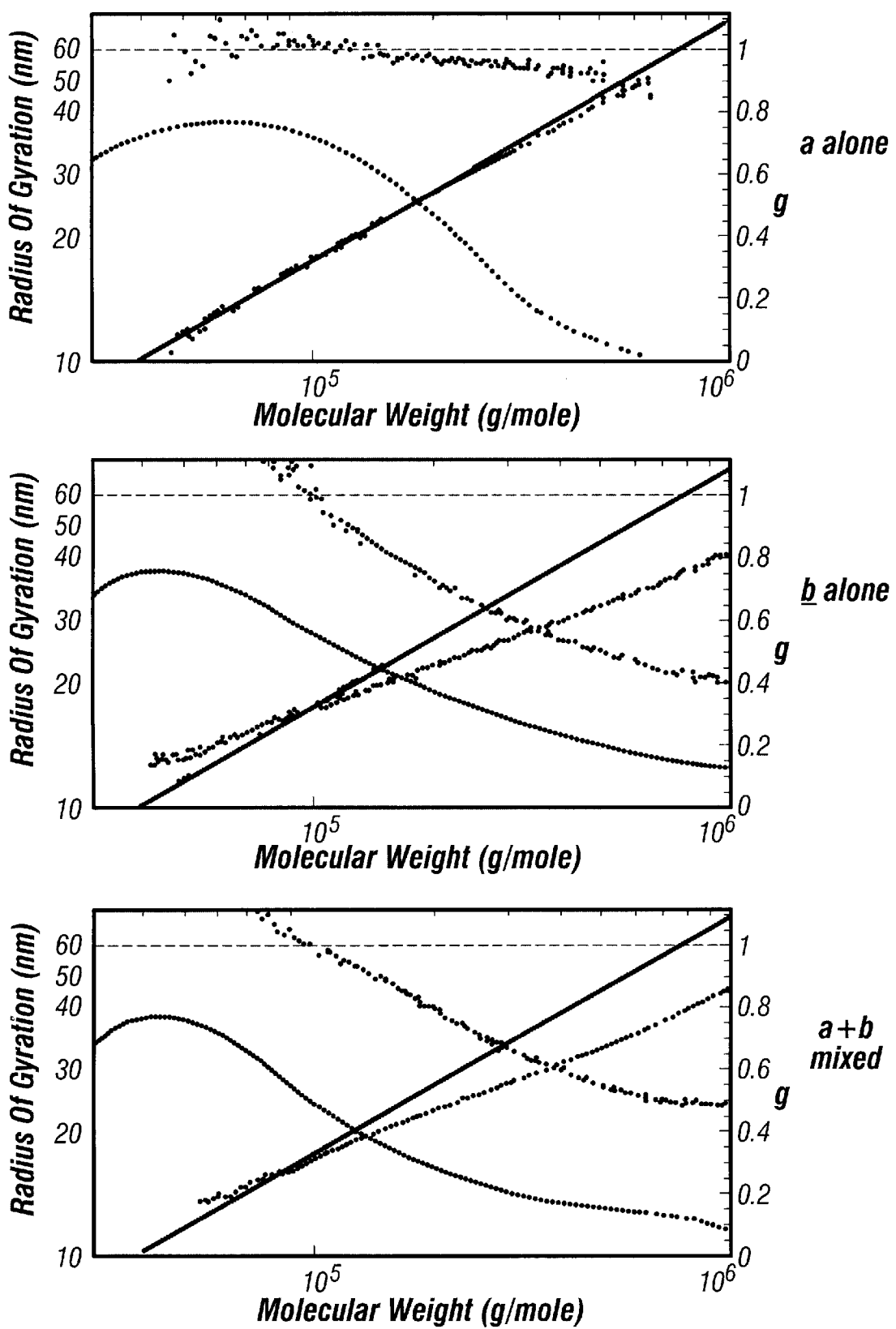
FIG. 1 shows GPC/DRI/MALLS of a polyethylene produced using mixed metallocene of embodiments of our invention, is compared with that of a or b alone, both relative to a linear standard, ECD-103 (available from ExxonMobil Chemical Co, Houston, Tex.).

A broad range of zirconocenes is contemplated. Zirconocene a is a bridged metallocene having tetrahydroindenyl (THI) ligand system. Zirconocene b is similar to a except for the ligand system which consists an indenyl ring system. Each or both metallocene component may be substituted. The substituents may independently be linear or branched alkyl groups from one to twenty carbons long, silicon containing group, halogenated hydrocarbyl substituents, phenyl and its derivatives, or any group containing nitrogen, phosphorous, boron, sulfur that produce an active catalyst system. Embodiments of our invention include a mixture of dimethylsilyl bis(tetrahydro-1-indenyl)zirconium dichloride and rac-dimethylsilys bis(1-indenyl)zirconium dichloride.

Supports

The zirconocenes are placed on a support.

Supports may be organic or inorganic.

Organic supports may be finely divided polymer particles, polyethylene and/or polystyrene, alternatively resinous support materials such as polystyrene or polystyrene divinyl benzene polyolefins or polymeric compounds or mixtures thereof.

Inorganic support may be one or more of silica, clays, or combinations thereof. For purposes of this patent specification the terms "carrier" or "support" are interchangeable and can be any support material, a porous support material, such as for example, talc, inorganic oxides, inorganic chlorides, for example magnesium chloride, and resinous support materials such as polystyrene or polystyrene divinyl benzene polyolefins or polymeric compounds or any other organic or inorganic support material and the like, or mixtures thereof.

The support materials may be inorganic oxide materials, which include those of Groups 2, 3, 4, 5, 13 or 14 metal oxides. The catalyst support materials include silica, silicates (including zeolites), alumina, composite oxides, and mixtures thereof. Other inorganic oxides that may be employed either alone or in combination with the silica, alumina or silica-alumina and magnesia, titania, zirconia, and the like.

The carrier of the catalyst of this invention has a surface area in the range of from 10–700 $m^2/g$, pore volume in the range of from 0.1–4.0 cc/g and average particle size in the range of from 5–500 $\mu$m. The surface area is in the range of from 50–500 $m^2/g$, pore volume of from 0.5–3.5 cc/g and average particle size of from 20–200 $\mu$m. The surface area range is from 100–400 $m^2/g$, pore volume from 0.8–3.0 cc/g and average particle size is from 20–100 $\mu$m. The average pore size of the carrier of the invention typically has pore size in the range of from 10–1000 Å, or 50–5000 Å, or 75–350 Å.

The zirconocenes may be both placed on a single support (co-deposited), or each zirconocene is separately placed on different support particles in two different operations. Support particles may be the same composition or different.

The separately supported a) and b) are then mixed either in a mixing device prior to placement (premixed) in a reactor or they may be mixed in a gas phase reactor (co-feed), or both techniques may be used. In an alternative embodiment, the catalysts, in an unsupported mode, may be mixed then atomized into a reactor, or they may be separately atomized into a reactor.

Mixtures

The ratio of a) to b) may be from 90:10–10:90; or 80:20–20:80; or 75:25–25:75; or 60:40–40:60; or 50:50.

For purposes of this patent specification and appended claims, the terms "cocatalysts" and "activators" are used interchangeably and are defined to be any compound or component which can activate a metallocene compound as defined above, for example, a Lewis acid or a non-coordinating ionic activator or ionizing activator or any other compound that can convert a neutral metallocene catalyst component to an active metallocene cation. It is within the scope of this invention to use alumoxane as an activator, and/or to also use ionizing activators, neutral or ionic, such as tri(n-butyl)ammonium tetrakis(pentafluorophenyl)boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529 and EP-A-0 561 476, EP-B1-0 279 586, EP-A-0 594-218 and WO 94/10180, all of which are fully incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-0 500 944, EP-A-0 277 003 and EP-A-0 277 004, and U.S. Pat. Nos. 5,153,157, 5,198,401, 5,066,741, 5,206,197, 5,241,025, 5,387,568 and 5,384,299 and U.S. patent application Ser. No. 08/285,380, filed Aug. 3, 1994, now abandoned, all incorporated herein by reference. Combinations of activators are also contemplated by the invention, for example, WO 94/07928 and WO 95/14044 and U.S. Pat. Nos. 5,153,157 and 5,453,410 all of which are incorporated herein by reference.

Monomers

In one embodiment, the invention is directed toward a polymerization process involving the polymerization of one or more of the monomer(s) including ethylene alone or in combination with one or more linear or branched monomer (s) having from 3 to 30 carbon atoms, or 3 to 12 carbon atoms, or 4 to 8 carbon atoms. The process is particularly well suited to the copolymerization reactions involving the polymerization of ethylene in combination with one or more of the monomers, for example alpha-olefin monomers of propylene, butene-1, pentene-1, 3- or 4-methylpentene-1, hexene-1, octene-1, decene-1, styrene and unsubstituted or substituted cyclic and polycyclic olefins such as cyclopentene, norbornenes and cyclohexene or a combination thereof. Other monomers for use with ethylene can include diolefins such as 1,4-hexadiene, 1,5-hexadiene, 1,7-octadiene, 1,9-decadiene, norbornadiene, and other unsaturated monomers. Higher alpha-olefins and polyenes or macromers can be used also. The comonomer may be an alpha-olefin having from 3 to 15 carbon atoms, or 4 to 12 carbon atoms or 4 to 10 carbon atoms.

In another embodiment ethylene is polymerized with at least two different comonomers to form a terpolymer and the like, the comonomers may be a combination of monomers, alpha-olefin monomers having 3 to 10 carbon atoms, or 3 to 8 carbon atoms, optionally with at least one diene monomer. The terpolymers include the combinations such as ethylene/butene-1/hexene-1, ethylene/propylene/butene-1, ethylene/propylene/hexene-1, ethylene/propylene/cyclic diolefins, including, but not limited to ethylene/propylene/norbornadiene, ethylene/propylene/1,9-decadiene and the like.

Polyethylenes

The polyethylenes that may be produced from the mixed metallocenes discussed above have surprising and unexpected properties. These properties are more surprising when the two metallocenes are separately supported then mixed prior to catalyzing the reaction between ethylene and one or more $\alpha$-olefins. These properties are even more surprising when the two metallocenes are codeposited onto a support prior to catalyzing the reaction between ethylene and one or more $\alpha$-olefins.

Among these properties that are surprising are the melt strength and MIR.

Catalyst component a), when activated with MAO in a gas phase reaction, delivers a melt strength/MIR balance of 4.2 cN/47 for a polymer having melt index (MI) of 0.58. Catalyst component b), when activated with MAO under the same polymerization condition, delivers a melt strength/ MIR balance of 10.2 cN/115 for a polymer having MI of 0.25 (see Table 3).

For a 50/50 co-deposited catalyst system (both a) and b) on the same support) the melt strength was 11.6 cN. (120 psi, 95:5 ethylene butene polymerization at 85° C. (see Table 2, Run #014). However, as can be seen from the data in Table 2, the melt strength of a 50/50 catalyst mixture, separately supported a) and b) on different support particles, is over 18 cN, greater than expected from a linear combination of the two melt strengths. This enhancement is even more surprising when one considers the fact that the MI of the polymer using the latter technique was in the 1.07–1.50 range, much higher than the MI of the individual polymers. Generally, the higher the MI the lower the melt strength. The MIR of the sample was measured to be 74.4.

Since LDPEs are typically blended with LLDPE to improve melt strength and viscosity response to shear, this latter parameter generally described by MIR, these blends are most often in the 10–40% range of LDPE inclusion, more likely 20–30%. The LLDPEs of embodiments of our invention are substantially non-blended.

By substantially non-blended, we intend that the LLDPEs of embodiments of our invention have less than 10 weight percent, or less than 5 weight percent, or less than 3 weight percent, or 0 weight percent of a separate, branched polymer, e.g. LDPE.

Usual processing aids and other additives are not included in this discussion of blend components. Such aids and additives include, but are not limited to anti-oxidants, anti-ozanants, processing aids, slip, anti-block, anti-fog, anti-stat, colorants and the like.

The densities of the LLDPEs of embodiments of our invention will be 0.910–0.965 g/cm$^3$ or 0.915–0.960 g/cm$^3$, or 0.915–0.950 g/cm$^3$, or 0.915–0.940 g/cm$^3$, or 0.915–0.930 g/cm$^3$.

The melt indices of the LLDPEs of embodiments of our invention, as measured by ASTM 1238 condition E, will be in the range of from 0.15–15 dg/min, or 0.1–10 dg/min, or 0.1–5 dg/min, or 0.1–3 dg/min. or 0.1–1 dg/min.

The melt index ratios (MIR, $I_{21}/I_2$), as defined by ASTM D1238 condition E will be in the range from 40–120, or 45–100, or 50–90, or 50–85, or 50–75. MIR in these ranges approximates that of film extrusion grade LDPE, and is indicative of viscosity reduction in response to shear. LLDPEs generally have a nearly flat or are unresponsive to shear in their viscosity. This property of a lack of "shear thinning" is a property that makes LLDPEs more difficult to process, as manifested in more power required to push or extrude the non-shear-thinning polymers.

The melt strength of polymers of embodiments of our invention, as measured by the method describes in the Experimental section, will be in the range of from 5–20, or 6–20, or 7–20, or 8–20, or 10–20. Again this range is descriptive of LDPE melt strength.

The composition distribution breadth index (CDBI) of the LLDPEs of embodiments of our invention will be in the range of 60–78%. Measurement of CDBI is determined by the technique known as temperature rising elution fractionation (TREF) for isotating individual fractions of a copolymer sample. The technique is described in *J. Poly. Sci. Phys. Ed.*, Vol. 20, Pg. 441 (1982) and U.S. Pat. No. 5,008,204, both incorporated herein by reference. The CDBI should be >40%, or >50%, or >60%.

The molecular weight distribution (MWD), or polydispersity index (PDI) also characterized by Mw/Mn, of the LLDPEs of embodiments of our invention will be generally ≦4.5, or ≦3.5, or ≦2.5. The weight average molecular weight (Mw) of the LLDPEs of embodiments of our invention is in the range of 60 k–200 k.

We believe that LLDPEs of embodiments of our invention will find application in films, molded articles such as packaging lids, thermoformed or foamed objects and the like.

Branching

For the purposes of this invention, the amount of branching is determined using the weight average branching index g of the branched polyethyelene. The branching index g is defined as:

$$g=[Rg]^2_{br}/[Rg]^2_{lin}.$$

"Rg" stands for Radius of Gyration, and is measured using Multi-Angle Laser Light Scattering (MALLS) equipment. "$[Rg]_{br}$" is the Radius of Gyration for the branched polymer sample and "$[Rg]_{lin}$" is the Radius of Gyration for a linear polymer sample. It is well known in the art that as the g value decreases, branchiness increases.

Long chain branching is inferred when the polymer radius of gyration deviates from that measured for a linear polymer. The average deviation level was calculated from gas permeation chromatography (GPC)/DRI/MALLS data using the procedure outlined below (DRI stands for Differential Refractive index detector, which detects mass of polymer passing through the GPC column). First, the GPC/DRI/MALLS data was used to obtain molecular weight averages ($M_{W/MZ}$) and polymer radius of gyration which gives absolute molecular weight. For polyethylene polymers, the MALLS measurement of Rg is particularly sensitive in the range from 100,000 Daltons to about 2,000,000 Daltons. For this reason, the data was then truncated outside this range.

The GPC/DRI/MALLS of a polyethylene produced using the mixed metallocene of embodiments of our invention, is compared with that of a or b alone, both relative to a linear standard, ECD-103 (available from ExxonMobil Chemical Co, Houston, Tex.). This is shown in FIG. 1. The dotted line on the top of each graph represents the theoretical g for a perfectly linear polymer. Any deviation from this line indicates branching, which typically increases with increasing molecular weight. In these examples, a) alone shows slight deviation from the g=1.0 reference line, whereas b) alone and (a+b mixed) show large deviations from the reference line. The weight-average, $<g>_W$, and z-average, $<g>_Z$, g-values are shown in the table below. The surprising observation is that the g values seen in (a+b mixed) case is about 30% more than one would expect from a simple additive effect.

|             | $<g>_W$ | $<g>_Z$ |
| --- | --- | --- |
| a alone     | 0.96    | 0.942   |
| b alone     | 0.566   | 0.44    |
| (a + b) mixed | 0.687 | 0.652   |

Also in FIG. 1 are shown the variations in the Radii of gyration for the three cases. The straight line drawn from the left bottom corner to the right top corner represents the Radius of gyration for an ideal linear chain. Any deviation from it indicates branching. The polymer produced from a) alone show slight but noticeable deviation from the linear standard, whereas the other two cases show large deviations. The surprising observation is that the Radius of gyration pattern seen in (a)+b) mixed) case is quite similar to the case of b) alone, despite the fact that the mixed catalyst contains only half as much the b) component. The separately-supported mixed metallocene catalyst polymer shows much stronger deviation from the linear standard, indicating enrichment of the polymer with about twice as much branched species relative to a) or b) alone. The exact nature of these branched species at the high molecular weight tails, is not well known.

Figure 2:
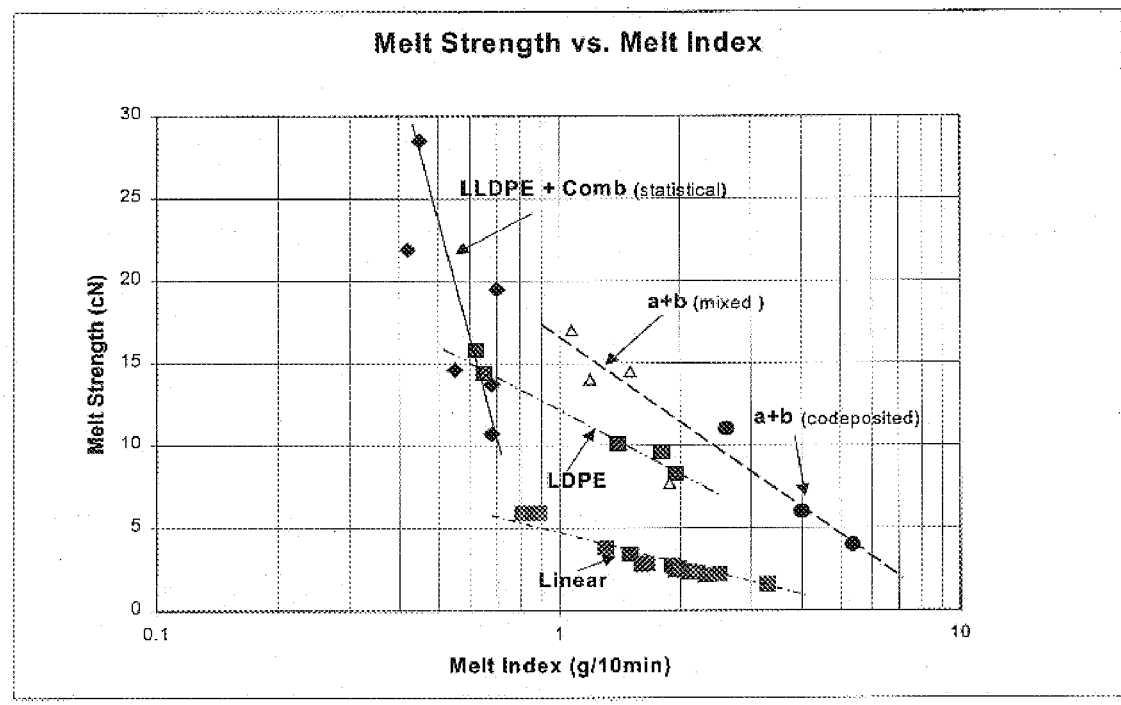
FIG. 2 is a plot of melt strength as a function of MI for mixed metallocenes a)+b).

FIG. 2 is a plot of melt strength as a function of MI for mixed metallocenes a)+b). There are two sets of points in the mixed metallocene line: one is for (a)+b)) blend, which is in the range of 1–2 MI, the other is for (a+b) codeposited and is in the 2–5 MI range. For comparison, LDPE and linear LLDPE lines are also shown along with the performance of a blend of LLDPE and combs (statistical). The comb blends were described in WO 98/34985.

Figure 3:
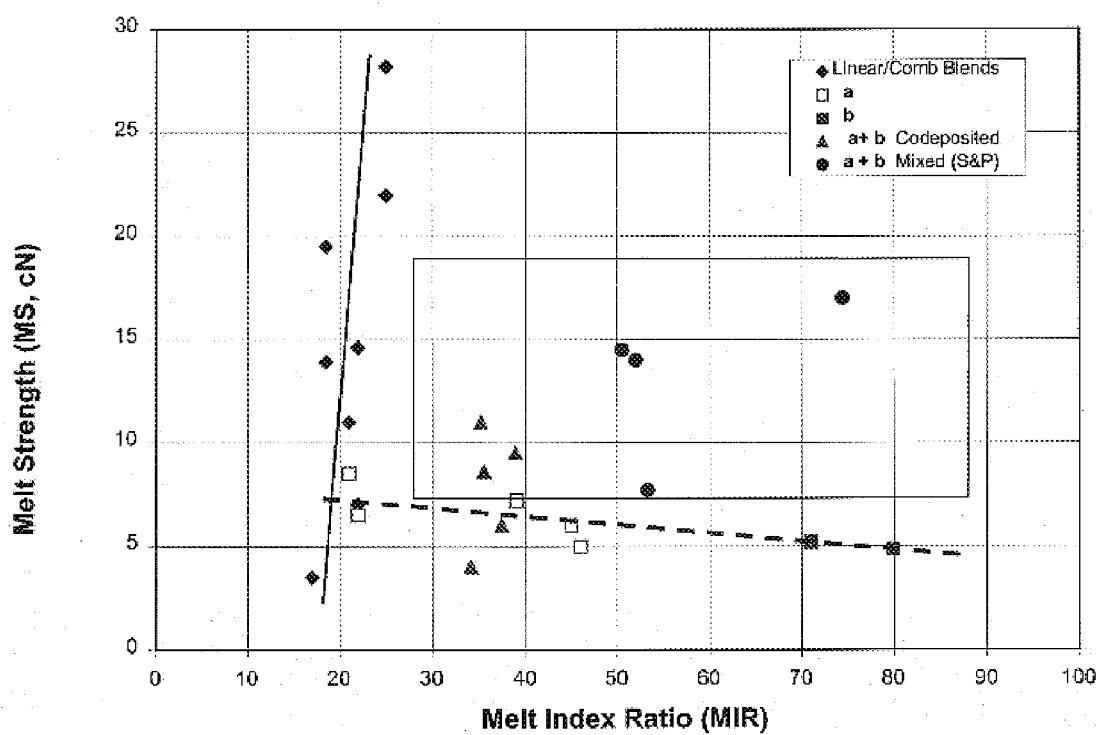
FIG. 3 is a plot of melt strength as a function of MIR for mixed metallocenes a)+b).

FIG. 3 is similar to FIG. 2 except that the MI axis is replaced by MIR. The rectangular box represents typical LDPE polymer range and is intended for comparison purposes only. Notice that the (a)+b)) blend gives much higher MIR/melt-strength response than the (a)+b)) codeposited case.

Experimental

Laboratory Gas Phase Reactor:

The polymers of embodiments are made in laboratory runs of gas phase ethylene and ethylene/butene are made in a two-liter autoclave, equipped with an anchor impeller and jacketed for heating. Sodium chloride is used as a fluidized bed in the reactor and is removed by dissolution and often by subsequent reprecipitation of the polymer. The salt is prepared by dehydration at 450° C. under nitrogen over several days. The reactor pressure is read in gauge pressure, rather than absolute, and is measured using a Sensotech pressure transducer.

Preparation of Supported Mixed Catalyst:

Metallocenes are pre-contacted with methylalumoxane and supported on silica using a preparation method in U.S. Pat. No. 5,863,853 incorporated herein by reference. The preparation is calculated such that the catalyst is deposited onto the support using just enough solvent to fill the support pores. By using this minimum wetting, drying times and the amount of solvent required are both reduced. The metallocene and methylalumoxane (MAO) are pre-contacted in toluene prior to introduction of the silica support material and mixing. Solvent removal by vacuum is continued to constant dryness (until no further weight loss occurred).

Supported Catalyst Preparation Example:

Materials: Silica: MS948m, 1.6 mL/g pore volume, W. R. Grace, Davison Chemical Division, Baltimore, Maryland (Davison Chemical Co.) previously heated to 600° C. under nitrogen. Dimethylsilylbis(tetrahydro-1-indenyl)zirconium Dichloride is used as purchased from Albemarle, and rac-Dimethylsilylbis(1-indenyl)zirconium Dichloride, from Boulder Scientific Corporation (BSC). Methylalumoxane: Thirty weight percent clear MAO solution in toluene available from Ethyl Corporation, Baton Rouge, La.

Dimethylsilylbis(tetrahydro-1-indenyl) zirconium Dichloride(0.001 moles, formula weight (FW) 456.57, 0.45 g), and rac-Dimethylsilylbis(1-indenyl)zirconium Dichloride (BSC-326, 0.448 g, FW 448.57 g, 0.001 moles), totaling 0.90 g, 0.002 moles, for 0.18 g Zr; plus 38.7 g MAO (30% in toluene, which represents 11.6 g MAO at 58 g/mole, and 5.4 g Al), and 41.6 g of dry toluene are used for a typical preparation. The zirconium catalysts at various weight/weight ratios are simultaneously dissolved in toluene, and then pre-contacted with MAO and let sit for 30 minutes to activate. 30 g silica are added and blended with a spatula. The solvent is evaporated in vacuo, and after reaching constant weight, a dry free-flowing supported catalyst powder is isolated.

Polymerization Procedure Example:

Polymerization runs are performed in a 2-liter autoclave reactor equipped with an anchor impeller, an external water jacket for temperature control, a regulated supply of dry nitrogen, ethylene or ethylene/butene mixture, and reactor ports for introduction of seed bed, scavenger, other comonomers, hydrogen, and supported catalyst. The reactor is dried and degassed at 140° C. under nitrogen for a minimum of one hour prior to use. A typical run consisted of introducing 200 g dried sodium chloride and 0.2 mL triethylaluminum (TEAL, 25 mole % in heptane) to the reactor and heating it to 100° C. The reactor is then vented and 0.8 psi of nitrogen purged through. After 5 minutes, nitrogen and the reactor outlet are sealed off and the supported catalyst, 500 mg as prepared below, is pressured into the reactor under nitrogen. Then 40 psig of ethylene is pressured throughout the run. The polymerization reaction is limited to 60 minutes. Venting and rapid cooling of the system quenches the reaction. The catalyst is killed by air exposure and the reactor contents are poured into distilled water to dissolve the seedbed. Polyethylene is recovered by filtration and rinsed by passing toluene, hexane and methanol at ambient temperature through a Buchner funnel containing the polymer.

Gas Phase Copolymerizations:

The polymers of embodiments are prepared in gas phase polymerization under standard conditions. Catalyst activity is defined as kilograms polymer produced (dry yield of isolated polymer product) per mole zirconocene per hour. Laboratory catalyst activity is expected to be lower than pilot scale measured activities, or productivities, due to thermodynamics of scale and the improvement in surface to volume ratio on the larger scale. Molecular weight behavior is important for the definition of a catalyst and process for film-forming polyethylenes. First, the polymer must be of a reasonable molecular weight to process easily into films, and second, the long chain branching known to improve processability may be decreased for a given catalyst system in the presence of hydrogen. Therefore, a system requiring minimal hydrogen to achieve molecular weights suitable for film applications may be desirable. The process conditions, as developed in our earlier work, were run at commercially viable temperature and pressure.

TABLE 1

CATALYST COMPARISIONS FOR LCB PE[1]:
LABORATORY GAS PHASE REACTOR AT 85° C. AND 100 PSI

| Metallocene | Run Number | Monomer(s) | Mw, k | MWD | Activity | Pseudo R1 |
|---|---|---|---|---|---|---|
| b) | 7-080 | $C_2$ | 143 | 4.5 | 1434 | |
|  | 8-079 | $C_2/C_4$ | 104 | 6.1 | 2087[2] | 0.75 |
| a) | 11-115 | $C_2$ | 57 | 3.8 | 1305 | |
|  | 12 126 | $C_2/C_4$ | 93 | 5.9 | 471 | 1.93 |

[1]Summary of Best Results over approximately 35 runs.
[2]Catalyst b) showed the highest activities for copolymerization.

TABLE 2

Supported MAO-Activated Gas Phase Catalyst Laboratory Runs[†]

| Run # | Catalyst Amount, mg. | Temp. °C. | Psi, Ethylene | Yield, grams | Act. kgP/ molM | NMR, wt %/m % butene | MI g/10 min | MIR | MS, cN | Mn × 1000 | Mw × 1000 |
|---|---|---|---|---|---|---|---|---|---|---|---|
| 014 | 500 codeposit | 85 | 120[1] | 23 | 980 | 7.8/4.0 | | | 11.6 | 21 | 86 |
| 029 | 1000 codeposit | 80 | 100[1] | 35 | 750 | 8.5/4.5 | 2.9 | 38.9 | 9.5 | 17 | 65 |
| 013 | 1000 codeposit | 85 | 100[1] | 52 | 1140 | 8.7/4.5 | 4.0 | 35.5 | 8.6 | 17 | 66 |
| 034 | 1000 codeposit | 90 | 100[1] | 18 | 410 | 8.0/4.2 | | | 10.8 | 13 | 82 |
| 102 | 500 + 500 blend | 85 | 100 | | | | 1.1 | 74.4 | 17.0 | 16 | 98 |
| 103 | 500 + 500 blend | 85 | 100 | | | | 1.2 | 52.0 | 14.0 | 19 | 89 |
| 104 | 500 + 500 blend | 85 | 100 | | | | 1.5 | 50.5 | 14.5 | 18 | 80 |
| 106 | 500 + 500 blend | 85 | 100 | 34 | 740 | 9.3/4.9 | | | 18.1 | 16 | 70 |
| 107 | 250a + 750b blend | 85 | 100 | 44 | 960 | 9.2/4.8 | | | 6.3 | 15 | 62 |
| 113 | 750a + 250b blend | 85 | 100 | 45 | 990 | | 1.9 | 53.3 | 7.7 | 16 | 69 |
| 117 | 1000 codeposit | 85 | 120 | 94 | | | 4.0 | 37.4 | 6.0 | | |
| 120 | 1000 codeposit | 90 | 100 | 33 | | | 2.6 | 35.2 | 11.0 | | |
| 122 | 1000 codeposit | 85 | 100 | 79 | | | 5.4 | 34.1 | 4.0 | | |

[†]a + b supported as given in the experimental section, unless otherwise noted.
[1]Ethylene gas purchased as a 95:5 mole percent ethylene:butene mix at 200 psi, for semi-continuous gas phase feed.

TABLE 3

PILOT PLANT RUNS

| Metallocene | a alone | b alone | a + b codeposited |
|---|---|---|---|
| Melt Index | 0.58 | 0.25 | 0.73 |
| MIR | 47 | 115 | 61 |
| MS cN | 4.2 | 10.2 | 7.8 |
| MWD | 3.6 | 3.8 | 3.7 |

Although the present invention has been described in considerable detail with reference to certain versions thereof, other versions are possible. For example, while metallocene catalysts are exemplified, any catalyst or catalyst system that produces polymers having a relatively high MIR and a relatively high melt strength are also contemplated. Therefore, the spirit and scope of the appended claims should not be limited to the description of the versions contained herein.

What is claimed is:

1. A substantially non-blended polyethylene characterized as having less than 10 weight percent of a separate, branched polymer, comprising:
   an ethylene, α-olefin copolymer wherein said α-olefin is one or more of propylene, butene-1, pentene-1, hexene-1 or octene-1;
      wherein said copolymer has a density in the range of 0.915–0.960 g/cm$^3$;
      wherein said copolymer has a MIR in the range of from 50–70;
      wherein said copolymer has a melt strength from 7–20 cN;
      wherein said copolymer has a Mw/Mn≦2.5;
      wherein said copolymer has a CDBI in the range of 65–75%;
      wherein said copolymer has a weight average molecular weight (Mw) in the range of 60 k–200 k; and
      wherein said copolymer has a MI in the range of from 0.1–1 dg/min, as determined by ASTM D1238 condition E.

2. A process for producing the substantially non-blended polyethylene of claim 1, the process comprising polymerizing ethylene in combination with one or more α-olefin.

3. The process of claim 2 wherein said process includes a mixed catalyst system, comprising:
   a) a bridged indenyl zirconocene dichloride wherein the indenyl group is saturated, and the substituents at each position are hydrogen; and
   b) a bridged indenyl zirconocene dichloride, wherein the indenyl is unsaturated;
      wherein said a) and said b) are each supported separately, each being on a silica support;
      wherein said a) and b) are present in said catalyst system in a ratio of 40:60 to 60:40; and
      wherein said catalyst system is activated by a methylalumoxane.

4. The process of claim 3 wherein said a) is dimethylsilylbis(tetrahydro-1-indenyl) zirconium dichloride, and said b) is rac-dimethylsilylbis(1-indenyl) zirconium dichloride.

5. The process of claim 2 wherein the polymerization is a gas phase polymerization.

6. The process of claim 3 wherein the gas phase polymerization comprises a fluidized bed reactor.

7. The substantially non-blended polyethylene of claim 1 wherein one α-olefin is copolymerized with ethylene.

8. The substantially non-blended polyethylene of claim 2 wherein the one α-olefin is butene.

* * * * *

UNITED STATES PATENT AND TRADEMARK OFFICE
CERTIFICATE OF CORRECTION

PATENT NO. : 6,734,265 B1 Page 1 of 1
APPLICATION NO. : 09/680644
DATED : May 11, 2004
INVENTOR(S) : Dekmezian et al.

It is certified that error appears in the above-identified patent and that said Letters Patent is hereby corrected as shown below:

Column 2, line 12, "thetrahydroindenyl" should be deleted, and -- tetrahydroindenyl -- inserted therefor.

Signed and Sealed this

Twenty-ninth Day of August, 2006

JON W. DUDAS
*Director of the United States Patent and Trademark Office*